United States Patent
Chang et al.

(10) Patent No.: US 11,119,674 B2
(45) Date of Patent: Sep. 14, 2021

(54) MEMORY DEVICES AND METHODS FOR OPERATING THE SAME

(71) Applicant: MACRONIX INTERNATIONAL CO., LTD., Hsinchu (TW)

(72) Inventors: Hung-Sheng Chang, Taipei (TW); Han-Wen Hu, Tainan (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 72 days.

(21) Appl. No.: 16/279,494

(22) Filed: Feb. 19, 2019

(65) Prior Publication Data

US 2020/0264790 A1 Aug. 20, 2020

(51) Int. Cl.

| G06N 3/08 | (2006.01) |
| G06N 3/063 | (2006.01) |
| G06N 3/04 | (2006.01) |
| G06N 3/02 | (2006.01) |
| G06F 7/544 | (2006.01) |
| G06F 3/06 | (2006.01) |
| G06F 13/40 | (2006.01) |
| G06F 13/16 | (2006.01) |

(52) U.S. Cl.
CPC ............ *G06F 3/0635* (2013.01); *G06F 3/068* (2013.01); *G06F 3/0617* (2013.01); *G06F 7/5443* (2013.01); *G06N 3/02* (2013.01)

(58) Field of Classification Search
CPC ...... G06F 3/0635; G06F 3/0617; G06F 3/068; G06F 7/5443; G06N 3/02
See application file for complete search history.

(56) References Cited

U.S. PATENT DOCUMENTS

| 4,219,829 A | 8/1980 | Dorda et al. |
| 4,987,090 A | 1/1991 | Hsu et al. |
| 5,029,130 A | 7/1991 | Yeh |
| 5,586,073 A | 12/1996 | Hiura et al. |
| 6,107,882 A | 8/2000 | Gabara et al. |
| 6,313,486 B1 | 11/2001 | Kencke et al. |

(Continued)

FOREIGN PATENT DOCUMENTS

| CN | 1998012 B | 11/2010 |
| CN | 105718994 A | 6/2016 |

(Continued)

OTHER PUBLICATIONS

Webopedia, "volatile memory", Oct. 9, 2017, pp. 1-4, https://web.archive.org/web/20171009201852/https://www.webopedia.com/TERM/V/volatile_memory.html (Year: 2017).*

(Continued)

*Primary Examiner* — Christopher D Birkhimer
(74) *Attorney, Agent, or Firm* — Haynes Beffel & Wolfeld LLP

(57) ABSTRACT

A memory device includes an array of composite memory units. At least one of the composite memory units comprises a first memory cell of a first type, a second memory cell of a second type, a first intra-unit data path connecting the first memory cell to the second memory cell, and a first data path control switch. The first data path control switch is responsive to a data transfer enable signal which enables data transfer between the first memory cell and the second memory cell through the first intra-unit data path.

3 Claims, 10 Drawing Sheets

(56) References Cited

U.S. PATENT DOCUMENTS

| | | |
|---|---|---|
| 6,829,598 B2 | 12/2004 | Milev |
| 6,906,940 B1 | 6/2005 | Lue |
| 6,960,499 B2 | 11/2005 | Nandakumar et al. |
| 7,089,218 B1* | 8/2006 | Visel .................. G06N 3/02 |
| | | 706/14 |
| 7,368,358 B2 | 5/2008 | Ouyang et al. |
| 7,436,723 B2* | 10/2008 | Rinerson ............... G11C 11/16 |
| | | 365/148 |
| 7,747,668 B2 | 6/2010 | Nomura et al. |
| 8,203,187 B2 | 6/2012 | Lung et al. |
| 8,275,728 B2 | 9/2012 | Pino |
| 8,432,719 B2 | 4/2013 | Lue |
| 8,589,320 B2 | 11/2013 | Breitwisch et al. |
| 8,630,114 B2 | 1/2014 | Lue |
| 8,725,670 B2* | 5/2014 | Visel .................. G06N 3/04 |
| | | 706/27 |
| 8,860,124 B2 | 10/2014 | Lue et al. |
| 9,064,903 B2 | 6/2015 | Mitchell et al. |
| 9,147,468 B1 | 9/2015 | Lue |
| 9,213,936 B2* | 12/2015 | Visel .................. G06N 3/04 |
| 9,379,129 B1 | 6/2016 | Lue et al. |
| 9,391,084 B2 | 7/2016 | Lue |
| 9,430,735 B1 | 8/2016 | Vali et al. |
| 9,431,099 B2 | 8/2016 | Lee et al. |
| 9,524,980 B2 | 12/2016 | Lue |
| 9,535,831 B2* | 1/2017 | Jayasena ............ G06F 12/0292 |
| 9,536,969 B2 | 1/2017 | Yang et al. |
| 9,589,982 B1 | 3/2017 | Cheng et al. |
| 9,698,156 B2 | 7/2017 | Lue |
| 9,698,185 B2 | 7/2017 | Chen et al. |
| 9,710,747 B2 | 7/2017 | Kang et al. |
| 9,747,230 B2* | 8/2017 | Han .................. G06F 3/0683 |
| 9,754,953 B2 | 9/2017 | Tang et al. |
| 9,767,028 B2* | 9/2017 | Cheng ................. G06F 15/7821 |
| 9,898,207 B2* | 2/2018 | Kim .................. G06F 3/067 |
| 9,910,605 B2* | 3/2018 | Jayasena ............. G06F 3/0631 |
| 9,978,454 B2* | 5/2018 | Jung .................. G11C 16/0483 |
| 9,983,829 B2* | 5/2018 | Ravimohan ........... G06F 3/0688 |
| 9,991,007 B2 | 6/2018 | Lee et al. |
| 10,037,167 B2* | 7/2018 | Kwon ................... G06F 3/0659 |
| 10,056,149 B2* | 8/2018 | Yamada ................ G11C 16/14 |
| 10,073,733 B1 | 9/2018 | Jain et al. |
| 10,157,012 B2* | 12/2018 | Kelner ................. G06F 3/0688 |
| 10,175,667 B2* | 1/2019 | Bang .................. G06F 1/206 |
| 10,242,737 B1 | 3/2019 | Lin et al. |
| 10,528,643 B1 | 1/2020 | Choi et al. |
| 10,534,840 B1 | 1/2020 | Petti |
| 10,643,713 B1 | 5/2020 | Louie et al. |
| 2003/0122181 A1 | 7/2003 | Wu |
| 2005/0287793 A1 | 12/2005 | Blanchet et al. |
| 2010/0182828 A1 | 7/2010 | Shima et al. |
| 2010/0202208 A1 | 8/2010 | Endo et al. |
| 2011/0063915 A1 | 3/2011 | Tanaka et al. |
| 2011/0106742 A1 | 5/2011 | Pino |
| 2011/0128791 A1 | 6/2011 | Chang et al. |
| 2011/0286258 A1 | 11/2011 | Chen et al. |
| 2011/0297912 A1 | 12/2011 | Samachisa et al. |
| 2012/0007167 A1 | 1/2012 | Hung et al. |
| 2012/0044742 A1 | 2/2012 | Narayanan |
| 2012/0182801 A1 | 7/2012 | Lue |
| 2012/0235111 A1 | 9/2012 | Osano et al. |
| 2012/0254087 A1* | 10/2012 | Visel .................. G06N 5/02 |
| | | 706/26 |
| 2013/0070528 A1 | 3/2013 | Maeda |
| 2013/0075684 A1 | 3/2013 | Kinoshita et al. |
| 2014/0063949 A1 | 3/2014 | Tokiwa |
| 2014/0119127 A1 | 5/2014 | Lung et al. |
| 2014/0149773 A1 | 5/2014 | Huang et al. |
| 2014/0268996 A1 | 9/2014 | Park |
| 2014/0330762 A1* | 11/2014 | Visel .................. G06N 3/04 |
| | | 706/26 |
| 2015/0008500 A1 | 1/2015 | Fukumoto et al. |
| 2015/0171106 A1 | 6/2015 | Suh |
| 2015/0199126 A1* | 7/2015 | Jayasena ............. G06F 12/0638 |
| | | 711/103 |
| 2015/0331817 A1* | 11/2015 | Han .................. G06F 3/0683 |
| | | 710/308 |
| 2016/0141337 A1 | 5/2016 | Shimabukuro et al. |
| 2016/0181315 A1 | 6/2016 | Lee et al. |
| 2016/0232973 A1* | 8/2016 | Jung .................. G11C 16/08 |
| 2016/0247579 A1 | 8/2016 | Ueda et al. |
| 2016/0308114 A1 | 10/2016 | Kim et al. |
| 2016/0336064 A1 | 11/2016 | Seo et al. |
| 2016/0358661 A1 | 12/2016 | Vali et al. |
| 2017/0003889 A1* | 1/2017 | Kim .................. G06F 3/0611 |
| 2017/0025421 A1 | 1/2017 | Sakakibara et al. |
| 2017/0092370 A1 | 3/2017 | Harari |
| 2017/0123987 A1* | 5/2017 | Cheng ................. G06F 13/42 |
| 2017/0148517 A1 | 5/2017 | Harari |
| 2017/0160955 A1* | 6/2017 | Jayasena ............. G06F 3/0647 |
| 2017/0169885 A1 | 6/2017 | Tang |
| 2017/0169887 A1 | 6/2017 | Widjaja |
| 2017/0263623 A1 | 9/2017 | Zhang et al. |
| 2017/0270405 A1 | 9/2017 | Kurokawa |
| 2017/0309634 A1 | 10/2017 | Noguchi et al. |
| 2017/0316833 A1 | 11/2017 | Ihm et al. |
| 2017/0317096 A1 | 11/2017 | Shin et al. |
| 2017/0337466 A1 | 11/2017 | Bayat et al. |
| 2018/0121790 A1 | 5/2018 | Kim et al. |
| 2018/0129424 A1* | 5/2018 | Confalonieri ......... G06F 3/0679 |
| 2018/0157488 A1 | 6/2018 | Shu et al. |
| 2018/0173420 A1* | 6/2018 | Li ..................... G06F 3/061 |
| 2018/0240522 A1* | 8/2018 | Jung .................. G06F 3/0679 |
| 2018/0246783 A1* | 8/2018 | Avraham ........... H03M 13/1108 |
| 2018/0286874 A1 | 10/2018 | Kim et al. |
| 2018/0342299 A1* | 11/2018 | Yamada ............. G11C 16/0483 |
| 2019/0035449 A1 | 1/2019 | Saida et al. |
| 2019/0043560 A1 | 2/2019 | Sumbul et al. |
| 2019/0065151 A1 | 2/2019 | Chen et al. |
| 2019/0102170 A1 | 4/2019 | Chen et al. |
| 2019/0148393 A1 | 5/2019 | Lue |
| 2019/0213234 A1 | 7/2019 | Bayat et al. |
| 2019/0220249 A1 | 7/2019 | Lee et al. |
| 2019/0244662 A1 | 8/2019 | Lee et al. |
| 2019/0286419 A1 | 9/2019 | Lin et al. |
| 2020/0026993 A1 | 1/2020 | Otsuka |
| 2020/0065650 A1 | 2/2020 | Tran et al. |
| 2020/0110990 A1 | 4/2020 | Harada et al. |
| 2020/0160165 A1 | 5/2020 | Sarin |

FOREIGN PATENT DOCUMENTS

| | | |
|---|---|---|
| CN | 105789139 A | 7/2016 |
| CN | 106530210 A | 3/2017 |
| EP | 2048709 A2 | 4/2009 |
| TW | 201523838 A | 6/2015 |
| TW | 201618284 A | 5/2016 |
| TW | 201639206 A | 11/2016 |
| TW | 201732824 A | 9/2017 |
| TW | 201741943 A | 12/2017 |
| TW | 201802800 A | 1/2018 |
| TW | 201822203 A | 6/2018 |
| WO | 2012009179 A1 | 1/2012 |
| WO | 2012015450 A1 | 2/2012 |
| WO | 2016060617 A1 | 4/2016 |
| WO | 2017091338 A1 | 6/2017 |
| WO | 2018201060 A1 | 11/2018 |

OTHER PUBLICATIONS

Webopedia, "DRAM—dynamic random access memory", Jan. 21, 2017, pp. 1-3, https://web.archive.org/web/20170121124008/https://www.webopedia.com/TERM/D/DRAM.html (Year: 2017).*

Scott Thornton, "What is DRAm (Dynamic Random Access Memory) vs SRAM?", Jun. 22, 2017, pp. 1-11, https://www.microcontrollertips.com/dram-vs-sram/ (Year: 2017).*

Anonymous, "Data In The Computer", May 11, 2015, pp. 1-8, https://web.archive.org/web/20150511143158/https://homepage.cs.uri.edu/faculty/wolfe/book/Readings/Reading02.htm (Year: 2015).*

(56) References Cited

OTHER PUBLICATIONS

Rod Nussbaumer, "How is data transmitted through wires in the computer?", Aug. 27, 2015, pp. 1-3, https://www.quora.com/How-is-data-transmitted-through-wires-in-the-computer (Year: 2015).*

Webopedia, "SoC", Oct. 5, 2011, pp. 1-2, https://web.archive.org/web/20111005173630/https://www.webopedia.com/TERM/S/SoC.html (Year: 2011).*

Jang et al., "Vertical cell array using TCAT(Terabit Cell Array Transistor) technology for ultra high density NAND flash memory," 2009 Symposium on VLSI Technology, Honolulu, HI, Jun. 16-18, 2009, pp. 192-193.

Kim et al. "Multi-Layered Vertical Gate NAND Flash Overcoming Stacking Limit for Terabit Density Storage," 2009 Symposium on VLSI Technology Digest of Papers, Jun. 16-18, 2009, 2 pages.

Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent).

Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.

Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep 1985, 8 pages.

-Sakai et al., "A Buried Giga-Ohm Resistor (BGR) Load Static RAM Cell," IEEE Symp. on VLSI Technology, Digest of Papers, Sep. 10-12, 1984, 2 pages.

Schuller et al., "Neuromorphic Computing: From Materials to Systems Architecture," US Dept. of Energy, Oct. 29-30, 2015, Gaithersburg, MD, 40 pages.

Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.

Soudry, et al. "Hebbian learning rules with memristors," Center for Communication and Information Technologies CCIT Report #840, Sep. 1, 2013, 16 pages.

Tanaka H., et al., "Bit Cost Scalable Technology with Punch and Plug Process for Ultra High Density Flash Memory," 2007 Symp. VLSI Tech., Digest of Tech. Papers, pp. 14-15.

U.S. Appl. No. 15/873,369, filed Jan. 17, 2018, entitled "Sum-Of-Products Accelerator Array," Lee et al., 52 pages.

U.S. Appl. No. 15/887,166, filed Feb. 2, 2018, entitled "Sum-Of-Products Array for Neuromorphic Computing System," Lee et al., 49 pages.

U.S. Appl. No. 15/922,359, filed Mar. 15, 2018, entitled "Voltage Sensing Type of Matrix Multiplication Method for Neuromorphic Computing System, " Lin et al., 40 pages.

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

U.S. Office Action in U.S. Appl. No. 16/233,414 dated Apr. 20, 2020, 17 pages.

Chen et al., "Eyeriss: An Energy-Efficient reconfigurable accelerator for deep convolutional neural networks," IEEE ISSCC, Jan. 31-Feb. 4, 2016, 3 pages.

EP Extended Search Report from EP19193290.4 dated Feb. 14, 2020, 10 pages.

Gonugondla et al., "Energy-Efficient Deep In-memory Architecture for NAND Flash Memories," IEEE International Symposium on Circuits and Systems (ISCAS), May 27-30, 2018, 5 pages.

Jung et al, "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.

Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.

TW Office Action from TW Application No. 10820980430, dated Oct. 16, 2019, 6 pages (with English Translation).

U.S. Office Action in U.S. Appl. No. 15/873,369 dated Dec. 4, 2019, 5 pages.

U.S. Office Action in U.S. Appl. No. 15/922,359 dated Oct. 11, 2019, 7 pages.

U.S. Office Action in U.S. Appl. No. 16/233,414 dated Oct. 31, 2019, 22 pages.

U.S. Office Action in related case U.S. Appl. No. 16/037,281 dated Dec. 19, 2019, 9 pages.

U.S. Office Action in related case U.S. Appl. No. 16/297,504 dated Feb. 4, 2020, 15 pages.

Wang et al., "Three-Dimensional NAND Flash for Vector-Matrix Multiplication," IEEE Trans. on Very Large Scale Integration Systems (VLSI), vol. 27, No. 4, Apr. 2019, 4 pages.

TW Office Action from TW Application No. 10920683760, dated Jul. 20, 2020, 4 pages.

U.S. Office Action in U.S. Appl. No. 16/233,404 dated Jul. 30, 2020, 20 pages.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Choi et al., "Performance Breakthrough in NOR Flash Memory With Dopant-Segregated Schottky-Barrier (DSSB) SONOS Devices," Jun. 2009 Symposium on VLSITechnology Digest of Technical Papers, pp. 222-223.

Fukuzumi et al. "Optimal Integration and Characteristics of Vertical Array Devices for Ultra-High Density, Bit-Cost Scalable Flash Memory," IEEE Dec. 2007, pp. 449-452.

Hsu et al., "Study of Sub-30nm Thin Film Transistor (TFT) Charge-Trapping (CT) Devices for 3D NAND Flash Application," 2009 IEEE, Dec. 7-9, 2009, pp. 27.4.1-27.4.4.

Hubert et al., "A Stacked SONOS Technology, Up to 4 Levels and 6nm Crystalline Nanowires, With Gate-All-Around or Independent Gates (Flash), Suitable for Full 3D Integration," IEEE 2009, Dec. 7-9, 2009, pp. 27.6.1-27.6.4.

Hung et al., "A highly scalable vertical gate (Vg) 3D Nand Flash with robust program disturb immunity using a novel PN diode decoding structure," 2011 Symp. on VLSI Technology (VLSIT), Jun. 14-16, 2011, pp. 68-69.

Katsumata et al., "Pipe-shaped BiCS Flash Memory With 16 Stacked Layers and Multi-Level-Cell Operation for UltraHigh Density Storage Devices," 2009 Symposium on VLSI Technology Digest of Technical Papers, Jun. 16-18, 2009, pp. 136-137.

Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.

Kim et al., "Three-Dimensional Nand Flash Architecture Design Based on Single-Crystalline STacked ARray," IEEE Transactions on Electron Devices, vol. 59, No. 1, pp. 35-45, Jan. 2012.

Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.

Nowak et al., "Intrinsic fluctuations in Vertical NAND flash memories," 2012 Symposium on VLSI Technology, Digest of Technical Papers, pp. 21-22, Jun. 12-14, 2012.

TW Office Action from TW Application No. 10820907820, dated Sep. 22, 2020, 41 pages.

Wang, Michael, "Technology Trends on 3D-NAND Flash Storage", Impact 2011, Taipei, dated Oct. 20, 2011, found at www.impact.org.tw/2011/Files/NewsFile/201111110190.pdf.

Y.X. Liu et al., "Comparative Study of Tri-Gate and Double-Gate-Type Poly-Si Fin-Channel Spli-Gate Flash Memories," 2012 IEEE

(56) References Cited

OTHER PUBLICATIONS

Silicon Nanoelectronics Workshop (SNW), Honolulu, HI, Jun. 10-11, 2012, pp. 1-2.

* cited by examiner

MEMORY DEVICES AND METHODS FOR OPERATING THE SAME

BACKGROUND

Field

The present disclosure relates to memory devices and, more particularly, to memory devices including volatile and non-volatile memory cells.

Description of Related Art

A neural network is an information processing paradigm that is inspired by the way biological nervous systems process information. With the availability of large training datasets and sophisticated learning algorithms, neural networks have facilitated major advances in numerous domains such as computer vision, speech recognition, and natural language processing.

The basic unit of computation in a neural network is a neuron. A neuron receives inputs from other neurons, or from an external source and computes an output. FIG. 1 illustrates an example neural network 100. The neural network 100 contains multiple neurons arranged in layers. The neural network 100 includes an input layer 102 of input neurons (i.e., neurons that provide the input data), three hidden layers 106, 108 and 110 of hidden neurons (i.e., neurons that perform computations and transfer information from the input neurons to the output neurons), and an output layer 104 of output neurons (i.e., neurons that provide the output data). Neurons in adjacent layers have synaptic layers of connections between them. For example, the synaptic layer 112 connects neurons in the input layer 102 and the hidden layer 106, the synaptic layer 114 connects neurons in the hidden layers 106 and 108, the synaptic layer 116 connects neurons in the hidden layers 108 and 110, and the synaptic layer 118 connects the neurons in the hidden layer 110 and the output layer 104. All these connections have weights associated with them. For example, the neurons 122, 124 and 126 in the hidden layer 106 are connected to a neuron 128 in the hidden layer 108 by connections with weights $w_1$ 132, $w_2$ 134 and $w_3$ 136, respectively. The output for the neuron 128 in the hidden layer 108 can be calculated as a function of the inputs ($x_1$, $x_2$, and $x_3$) from the neurons 122, 124 and 126 in the hidden layer 106 and the weights $w_1$ 132, $w_2$ 134 and $w_3$ 136 in the connections. The function can be expressed as follows:

$$f(x_i) = \sum_{i=1}^{M} w_i X_i$$

In the sum-of-products expression above, each product term is a product of a variable input $x_i$ and a weight $w_i$. The weight $w_i$ can vary among the terms, corresponding, for example, to coefficients of the variable inputs $x_i$. Similarly, outputs from the other neurons in the hidden layer can also be calculated. The outputs of the two neurons in the hidden layer 110 act as inputs to the output neuron in the output layer 104.

Neural networks can be used to learn patterns that best represent a large set of data. The hidden layers closer to the input layer learn high level generic patterns, and the hidden layers closer to the output layer learn more data-specific patterns. Training is a phase in which a neural network learns from training data. During training, the connections in the synaptic layers are assigned weights based on the results of the training session. Inference is a stage in which a trained neural network is used to infer/predict input data and produce output data based on the prediction.

A convolutional neural network is a type of neural network that comprises one or more convolutional hidden layers after the input layer which are then followed by one or more fully connected hidden layers. A convolutional neural network is most commonly applied to analyze 2D data, such as object recognition within images. In a convolution hidden layer, a dot product between an area of an input image and a weight matrix can be calculated by sliding the weight matrix through the whole image and repeating the same dot product operation. The convolutional hidden layers are used to detect high-level features of the input image. The output of the last convolutional hidden layer is the input of the first fully connected hidden layer. Every neuron in a fully connected hidden layer is connected to every neuron in the adjacent fully connected hidden layers. The purpose of the fully connected hidden layers is to use a non-linear combination of the features detected in the convolution hidden layers to classify the objects in the input image.

In-memory computing is an approach in which memory cells, organized in an in-memory computing device, can be used for both data processing and memory storage. A neural network or a convolution neural network can be implemented in an in-memory computing device. The weights for the sum-of-products function can be stored in memory cells of the in-memory computing device. The sum-of-products function can be realized as a circuit operation in the in-memory computing device in which the electrical characteristics of the memory cells of the array effectuate the function.

In in-memory computing devices with volatile memory cells (e.g., SRAM), the time taken for performing sum-of-products operations may be short, and the operations may have high inference accuracies. However, it may take a long time to load weights in the volatile memory cells from other memory cells storing the weights needed for the sum-of-products operations. Also, performing sum-of-products operations with volatile memory cells may result in large power consumption.

In in-memory computing devices with non-volatile memory cells, device variability in the memory cells, inaccurate read and write operations, and other non-ideal device characteristics can lead to fluctuations in the weights stored in the non-volatile memory cells. The fluctuations in the stored weights, especially in in-memory computing devices using reprogrammable non-volatile memory devices such as floating gate memories, phase change memories, resistive RAMs, etc., can lead to less accurate output data by the neural networks implemented in the in-memory computing devices.

It is desirable to provide an in-memory computing device, with higher inference accuracy that can perform fast and low-power sum-of-products operations.

SUMMARY

An integrated circuit is described herein that comprises an in-memory computing device implementing a neural network. In some embodiments, the in-memory computing device can implement a convolution neural network. The in-memory computing device has an array of composite memory units. Each composite memory unit comprises a first memory cell of a first type, a second memory cell of a second type, a first intra-unit data path connecting the first memory cell to the second memory cell and a first data path control switch. The first intra-unit data path connects a current carrying terminal of the first memory cell to a current carrying terminal of the second memory cell. The first data path control switch is responsive to a data transfer enable signal which enables data transfer between the first memory cell and the second memory cell through the first intra-unit data path.

The first type of memory cells may be volatile memory cells (e.g., SRAM) whereas the second type of memory cells may be volatile memory cells (e.g., floating gate memories, phase change memories, resistive RAMs, magnetoresistive RAMs, ferroelectric RAMs, etc.). The first memory cells in the array of composite memory units are configured for fast and more accurate sum-of-products operations. The second memory cells in the array of composite memory units are configured to store weights for the synaptic layers of neural networks. The second memory cells in the array of composite memory units may also be configured to store the results of sum-of-products operations.

First memory cells and second memory cells in rows of composite memory units in the array are coupled to a set of first word lines and a set of second word lines, respectively. First memory cells and second memory cells in columns of composite memory units in the array are coupled to a set of first bit lines and a set of second bit lines, respectively. Second memory cells in columns of composite memory units are coupled to a set of first source lines. The array of composite memory units may further comprise signal control circuitry electrically coupled to the set of first word lines, the set of second word lines, the set of first bit lines, the set of second bit lines and the set of first source lines. The signal control circuitry may also assert data transfer enable signals to first data path control switches in the array of composite memory units.

In some embodiments of an in-memory computing device, each composite memory unit may further comprise a third memory cell of the second type. A second intra-unit data path may connect the first memory cell to the third memory cell. A second data path control switch responsive to a data transfer enable signal enables data transfer between the first memory cell and the third memory cell through the second intra-unit data path.

Also described are methods of transferring data between the memory cells in a composite memory unit, methods of performing sum-of-products operations using composite memory units, and control circuits arranged to carry out the methods.

Other aspects and advantages of the present disclosure can be seen on review of the drawings, the detailed description, and the claims, which follow.

BRIEF DESCRIPTION OF THE DRAWINGS

A detailed description of embodiments of the present technology is provided with reference to the FIGS. 1-15.

DETAILED DESCRIPTION

A detailed description of embodiments of the present disclosure is provided with reference to the FIGS. 1-12.

Figure 1:
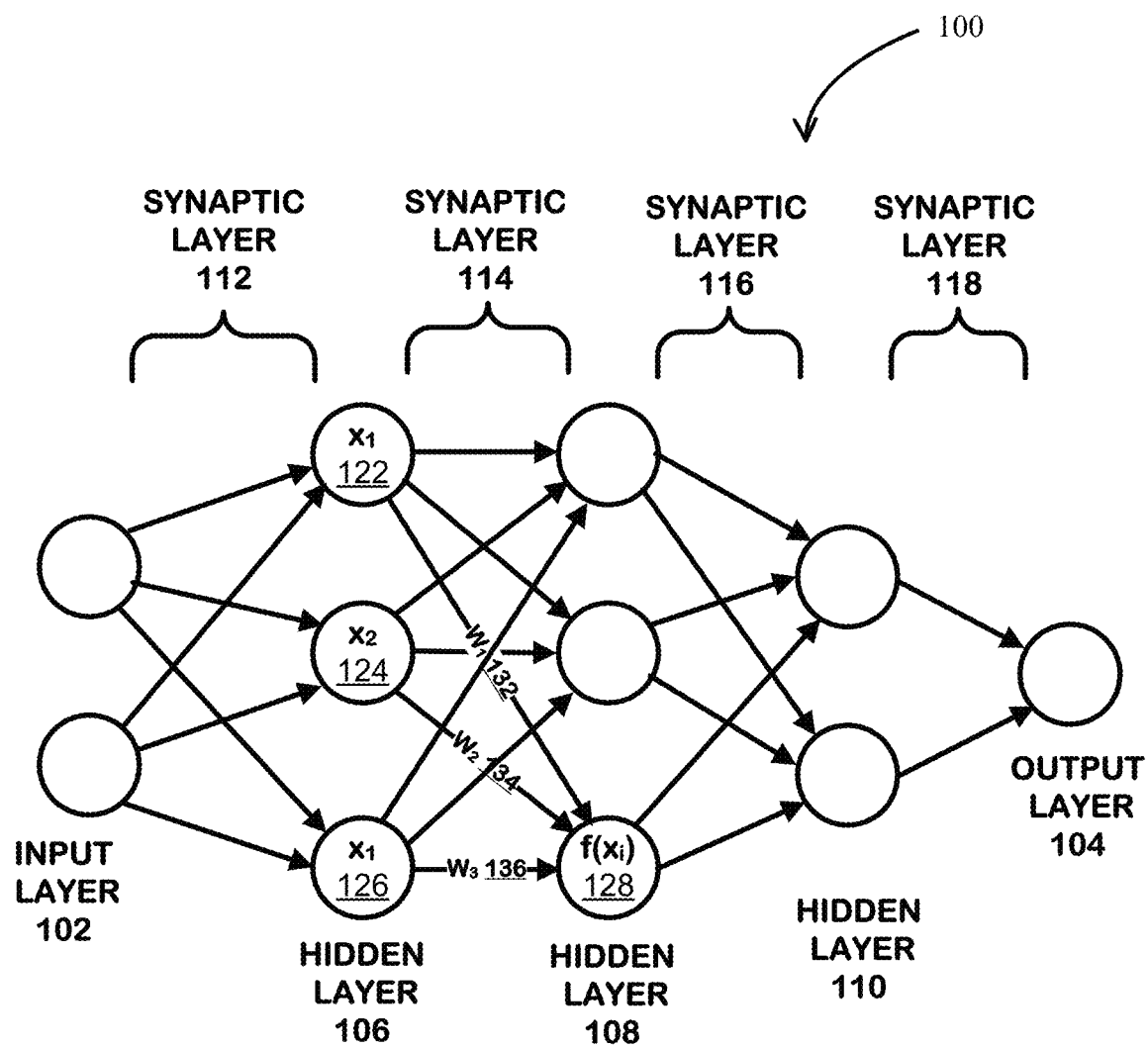
FIG. 1 illustrates an example neural network.
Figure 2:
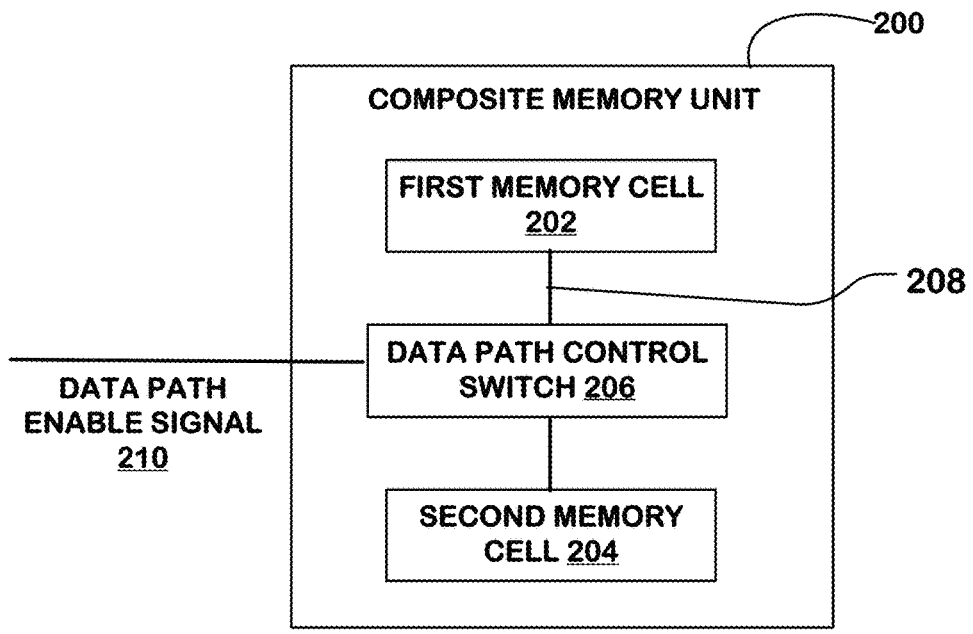
FIG. 2 illustrates a first example of a composite memory unit with a first memory cell and a second memory cell.

FIG. 2 is a simplified diagram of a composite memory unit 200. The composite memory unit 200 includes a first memory cell 202 of a first type, and a second memory cell 204 of a second type. A first intra-unit data path 208 connects the first memory cell 202 to the second memory cell 204. Data transfer between the first memory cell 202 and the second memory cell 204 through the first intra-unit data path 208 may be controlled by a first data path control switch 206. A "switch" is an electrical component that can interrupt data flow in a conducting path such as the first intra-unit data path 208. A switch can remove or restore the conducting path in a circuit in response to an applied signal. The first data path control switch 206 can be turned "on" when a data transfer enable signal 210 is applied to the switch. For example, data is allowed to flow in the first intra-unit data path 208 between the first memory cell 202 and the second memory cell 204 when the data transfer enable signal 210 is asserted. If the data transfer enable signal 210 is not asserted, data is not allowed to flow in the first intra-unit data path 208. The first data path control switch 206 can be N-channel transistors, P-channel transistors or transmission gates.

The first type of memory cells may be volatile memory cells (e.g., SRAM). The weight stored in the first memory cell 202 may be the information stored in the memory cells, for example, the SRAM storing bits "0" and "1". The second type of memory cells may be non-volatile memory cells (e.g., floating gate memories, phase change memories, resistive RAMs, magnetoresistive RAMs, ferroelectric RAMs, etc.). In some embodiments, the second type of memory cells may be accompanied by a transistor (e.g., 1T-1R resistive RAMs). Memory cells of the second type may be reprogrammable memory cells so that weights stored in the second type of memory cell can be changed while training the neural network or fine-tuning the neural network for higher inference accuracy. In some embodiments, the weights stored in memory cells of the second type may be sensed based on the resistances of the memory cells, for example, memory cells such as resistive RAM, floating gate MOSFETs, dielectric charge trapping devices (e.g., SONOS, BE-SONOS, TANOS, MA BE-SONOS) and phase change memories.

The first memory cell 202 can be used to a store a weight $W_F$ and perform a sum-of-products operation with the stored weight given an input x. The output of the sum-of-products operation is x* $W_F$. The second memory cell 204 can be used to a store a weight $W_S$ and perform a sum-of-products operation with the stored weight given an input y. The output of the sum-of-products operation is y*$W_S$. The second memory cell 204 can also be used to store the weight $W_F$ for the first memory cell 202. Before a sum-of-products operation by the first memory cell, the weight stored in the second memory cell can be loaded into the first memory cell through the first intra-unit data path 208. The first memory cell 202 can store the result of the sum-of-products operation in the second memory cell 204 through the first intra-unit data path 208.

Figure 3:
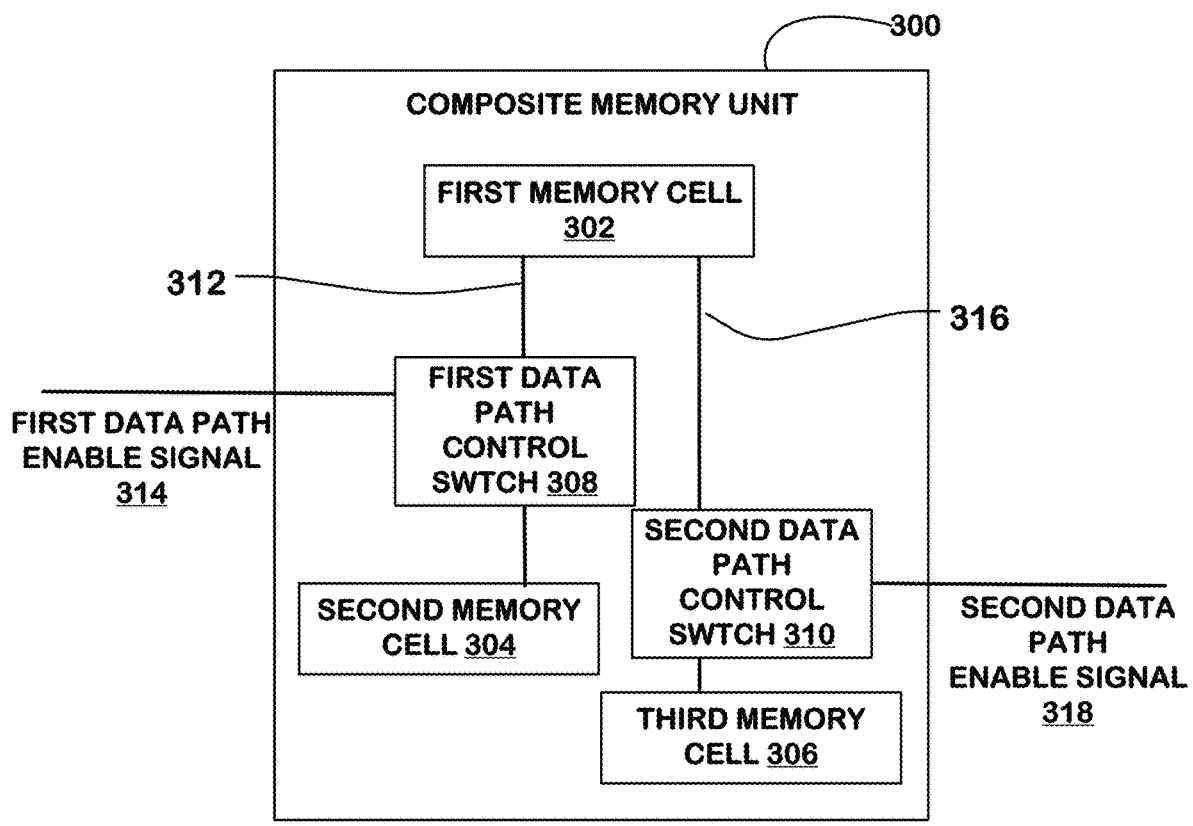
FIG. 3 illustrates a second example of a composite memory unit with a first memory cell, a second memory cell, and a third memory cell.

FIG. 3 is a simplified diagram of another example of a composite memory unit 300. The composite memory unit 300 includes a first memory cell 302 of the first type, a second memory cell 304 of the second type and a third memory cell 306 of the second type. A first intra-unit data path 312 connects the first memory cell 302 to the second memory cell 304. Data transfer between the first memory cell 302 and the second memory cell 304 through the first intra-unit data path 312 is controlled by a first data path control switch 308 responsive to a first data transfer enable signal 314. A second intra-unit data path 316 connects the first memory cell 302 to the third memory cell 306. Data transfer between the first memory cell 302 and the third memory cell 306 through the second intra-unit data path 316 is controlled by a second data path control switch 310 responsive to a second data transfer enable signal 318. The first data path control switch 308 and the second data path control switch 310 can be N-channel transistors, P-channel transistors or transmission gates.

In addition to performing sum-of-products operations, the second memory cell 304 can be used to store a weight for the first memory cell 302. Before a sum-of-products operation by the first memory cell, the weight stored in the second memory cell can be loaded into the first memory cell through the first intra-unit data path 312. The first memory cell 302 can store the result of a sum-of-products operation in the third memory cell 306 through the second intra-unit data path 314.

Figure 4:
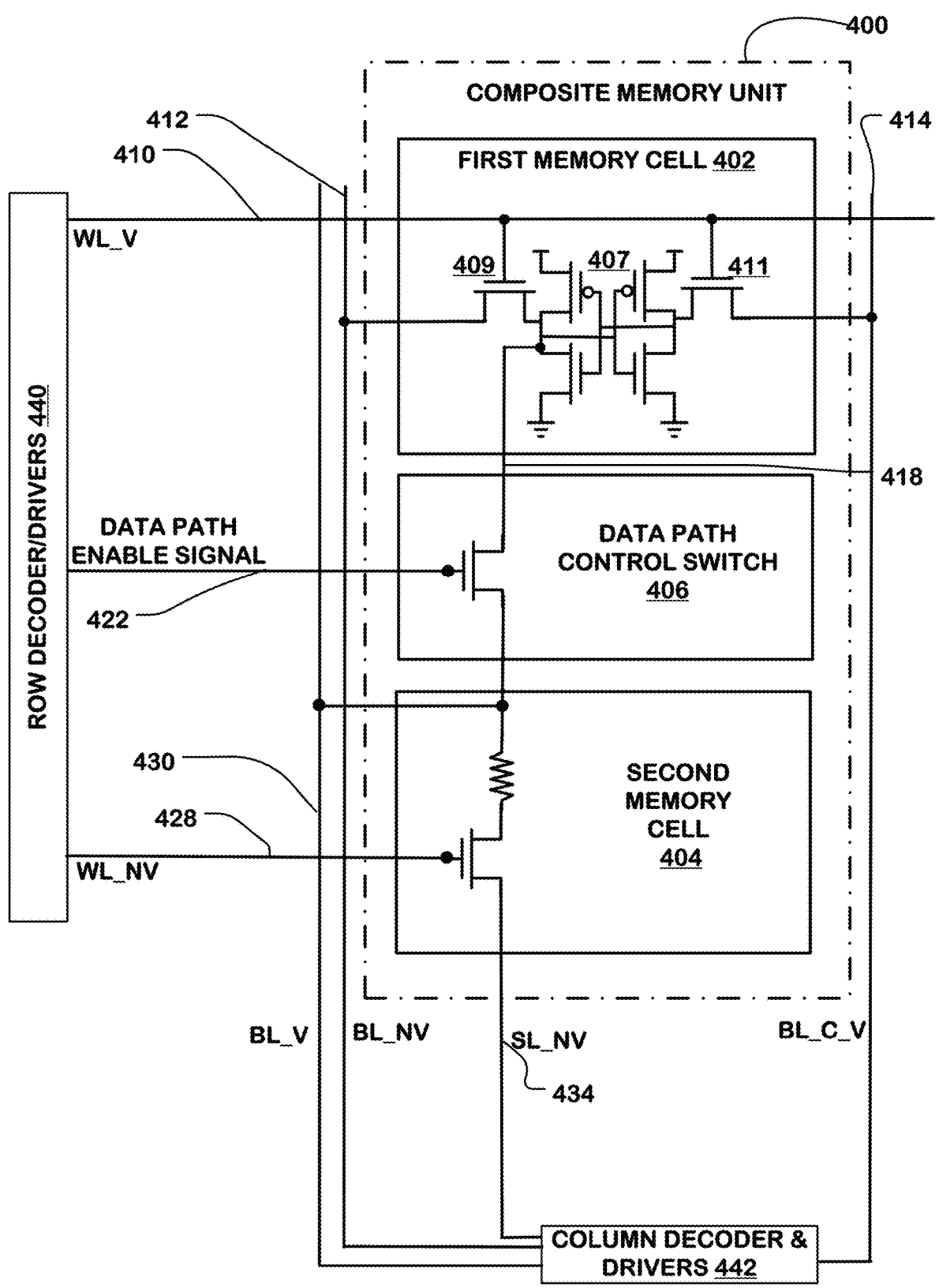
FIG. 4 illustrates a composite memory unit with an SRAM as the first memory cell and a 1T-1R RRAM as the second memory cell.

FIG. 4 illustrates a composite memory unit 400 with an SRAM as the first memory cell 402 and a 1T-1R RRAM as the second memory cell 404. The SRAM in first memory cell 402 includes a pair of cross-coupled inverters 407 and two pass-gate transistors 409 and 411. The pass-gate transistors 409 and 411 are coupled to a first word line 410. One of the pass-gate transistors is coupled to a first bit line 412, while the other is coupled to a first bit complement line 414. A weight factor $W_F$ and the complement of the weight factor ~$W_F$ may be stored in the pair of cross-coupled inverters 407 of the first memory cell 402.

The second memory cell 404 includes a transistor and a resistive RAM. The second memory cell 404 is electrically coupled to a second word line 428, a second bit line 430 and a first source line 434. A weight factor $W_S$ may be stored in the resistive RAM of the second memory cell 404.

An intra-unit data path 418 connects one of the current carrying terminals of the inverter (i.e., the terminal storing the weight factor $W_F$) in the first memory cell 402 to one of the current carrying terminals of the resistive RAM of the second memory cell 404. The other current carrying terminal of the resistive RAM is connected to the transistor of the second memory cell 404. An N-channel transistor acting as the first data path control switch 406 controls the current flow or data transfer between the pair of cross-coupled inverters 407 of the first memory cell 402 and the resistive RAM of the second memory cell 404.

A first signal control circuitry, such as a row decoder and driver circuitry 440, is electrically coupled to the first memory cell 402 and the second memory cell 404 through the first word line 410 and the second word line 428, respectively. The row decoder and driver circuitry 440 is also coupled to the gate terminal of the N-channel transistor acting as the first data path control switch 406 through a conducting path 422. The row decoder and driver circuitry 440 may assert a first data transfer enable signal through the conducting path 422 to the first data path control switch 406 to allow current flow or data transfer between the pair of cross-coupled inverters 407 of the first memory cell 402 and the resistive RAM of the second memory cell 404. A second signal control circuitry, such as a column decoder and driver circuitry 442, is coupled to the first memory cell 402 through the first bit line 412 and the first bit complement line 414. The column decoder and driver circuitry 442 is also electrically coupled to the second memory cell 404 through the second bit line 430 and the source line 434. In some embodiments, the column decoder and driver circuitry 442 may include sense amplifiers.

Figure 5:
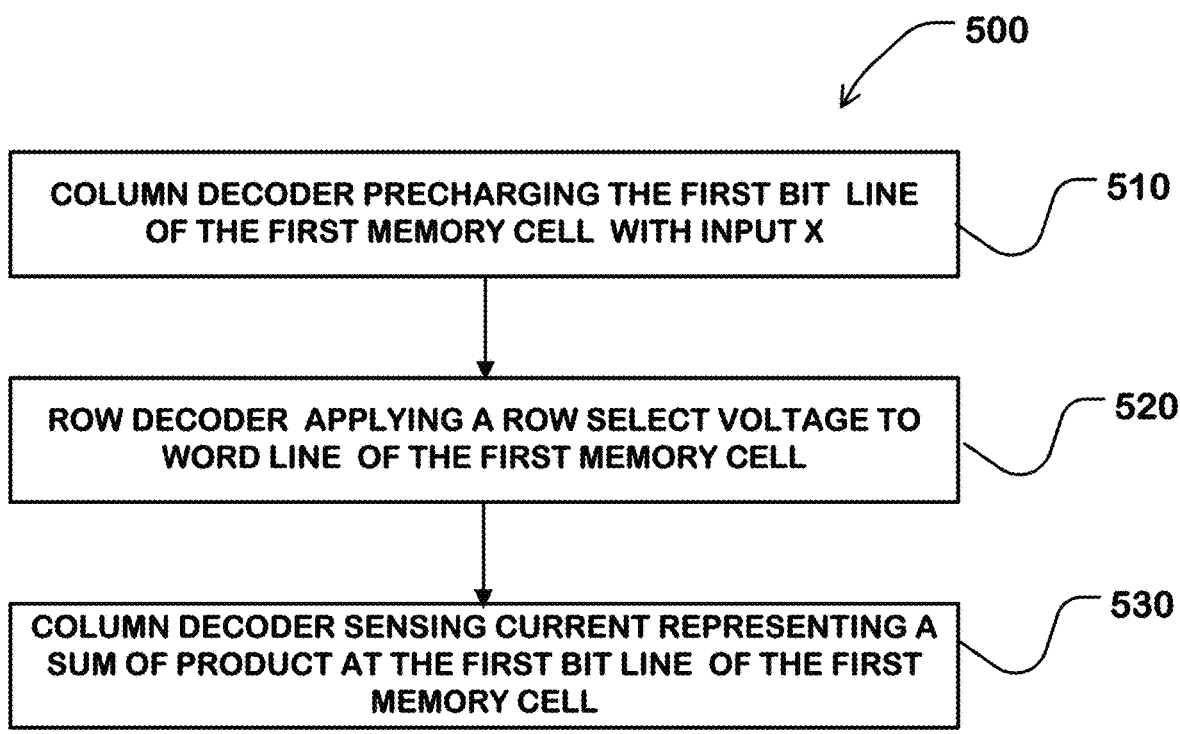
FIG. 5 illustrates an example method of performing a sum-of-products operation with a first memory cell in a composite memory unit.

FIG. 5 illustrates an example method 500 of performing a sum-of-products operation with a first memory cell 402 in a composite memory unit 400. Even though the example method 500 is described in conjunction with the composite memory unit 400, the example method 500 can be performed by any other embodiment of composite memory units described herein. A weight factor $W_F$ is stored in the pair of cross-coupled inverters 407 of the first memory cell 402. At step 510, the column decoder and driver circuitry 442 precharges the first bit line 412 of the first memory cell 402 with a signal representing the input x. At step 520, the row decoder and driver circuitry 440 applies a row select voltage to the first word line 410 of the first memory cell 402. A row select voltage can be characterized as being equal to or greater than the threshold voltages of the transistors coupled to the word lines. Applying the row select voltage to the first word line 410 of the first memory cell 402 turns on the two pass-gate transistors 409 and 411. At step 530, the column decoder and driver circuitry 442 senses current at the first bit line 412. The sensed current represents the sum-of-products x* $W_F$ of the input x by the weight factor $W_F$ stored in the first memory cell 402. The output current can be sensed on the first bit line 412, using voltage and current sensing technologies or other sensing technologies.

Figure 6:
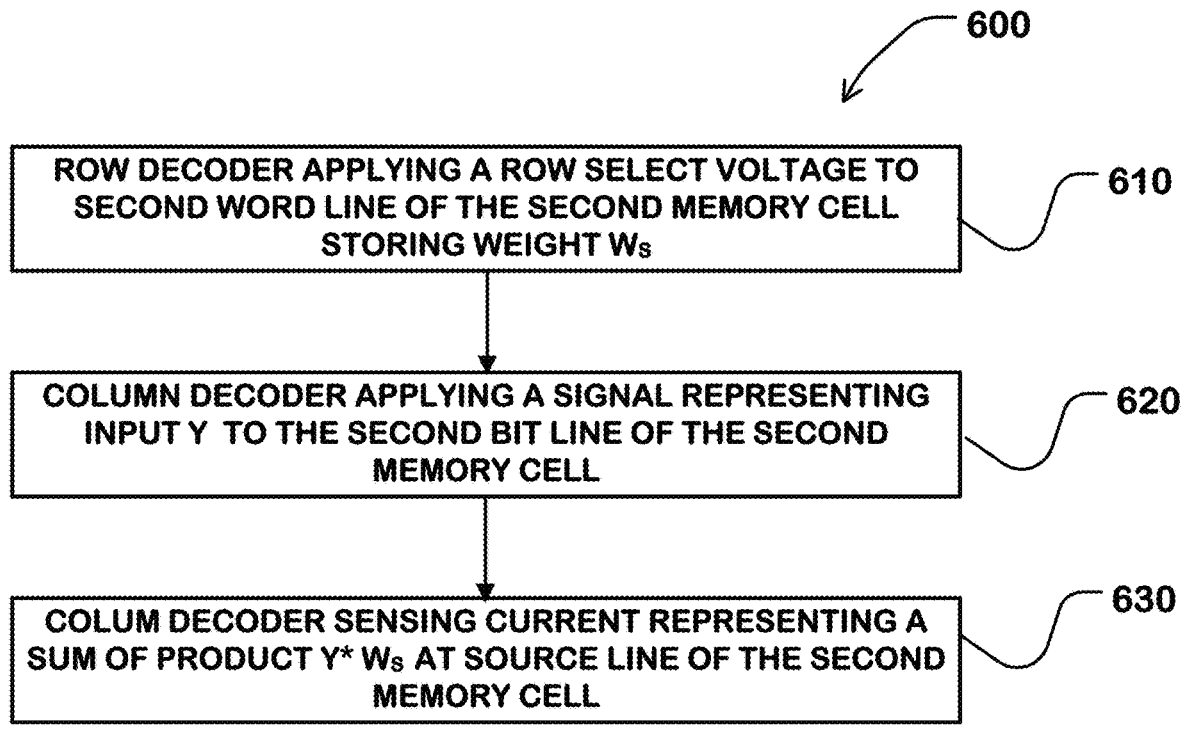
FIG. 6 illustrates an example method of performing a sum-of-products operation with a second memory cell in a composite memory unit.

FIG. 6 illustrates an example method 600 of performing a sum-of-products operation with a second memory cell 404 in a composite memory unit 400. Even though the example method 600 is described in conjunction with the composite memory unit 400, the example method 600 can be performed by any other embodiment of composite memory units described herein. A weight factor $W_S$ is stored in the resistive RAM of the second memory cell 404. At step 610, the row decoder and driver circuitry 440 applies a row select voltage to the second word line 428 of the second memory cell 404. At step 620, the column decoder and driver circuitry 442 applies a signal representing the input y to the second bit line 430 of the second memory cell 404. At step 630, the column decoder and driver circuitry 442 senses current at the first source line 434. The sensed current represents the sum-of-products y* $W_S$ of the input y by the weight factor $W_S$ stored in the second memory cell 404. The output current can be sensed on the first source line 434, using voltage and current sensing technologies or other sensing technologies. Alternately, the signal representing the input y can be applied to the first source line 434, and the output current can be sensed at the second bit line 430.

Figure 7:
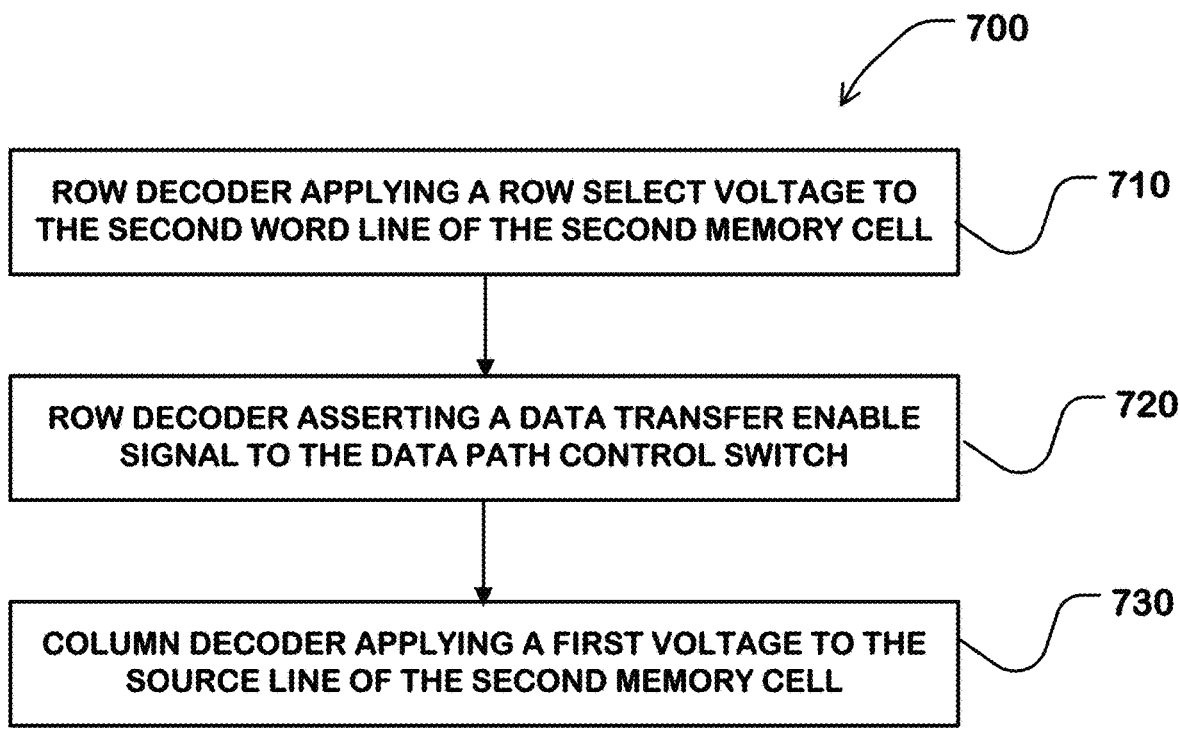
FIG. 7 illustrates an example method of transferring data from the second memory cell to the first memory cell in a composite memory unit.

FIG. 7 illustrates an example method 700 of transferring data from the second memory cell 404 to the first memory cell 402 in the composite memory unit 400. The example method can be used to load a weight stored in the second memory cell to the first memory cell in a composite memory unit. Even though the example method 700 is described in conjunction with the composite memory unit 400, the example method 700 can be performed by any other embodiment of composite memory units described herein. At step 710, the row decoder and driver circuitry 440 applies a row select voltage to the second word line 428 of the second memory cell 404. At step 720, the row decoder and driver circuitry 440 asserts a data transfer enable signal to the data path control switch 406 to enable data transfer between the first memory cell 402 and the second memory cell 404. At step 730, the column decoder and driver circuitry 442 applies a first activating voltage to the source line 434 of the second memory cell 404. The first activating voltage creates a voltage difference between the resistive RAM of the second memory cell 404 and the pair of cross-coupled inverters 407 of the first memory cell 402, allowing data to be transferred from the resistive RAM of the second memory cell 404 to the pair of cross-coupled inverters 407 through the intra-unit data path 418. The current in the first intra-unit data path is determined by the resistance of the resistive RAM of the second memory cell 404. The current in the intra-unit data path 418 stores a new weight factor $W_F$ in the first memory cell 402 on dependence upon the weight factor $W_S$ stored in the resistive RAM of the second memory cell 404.

Figure 8:
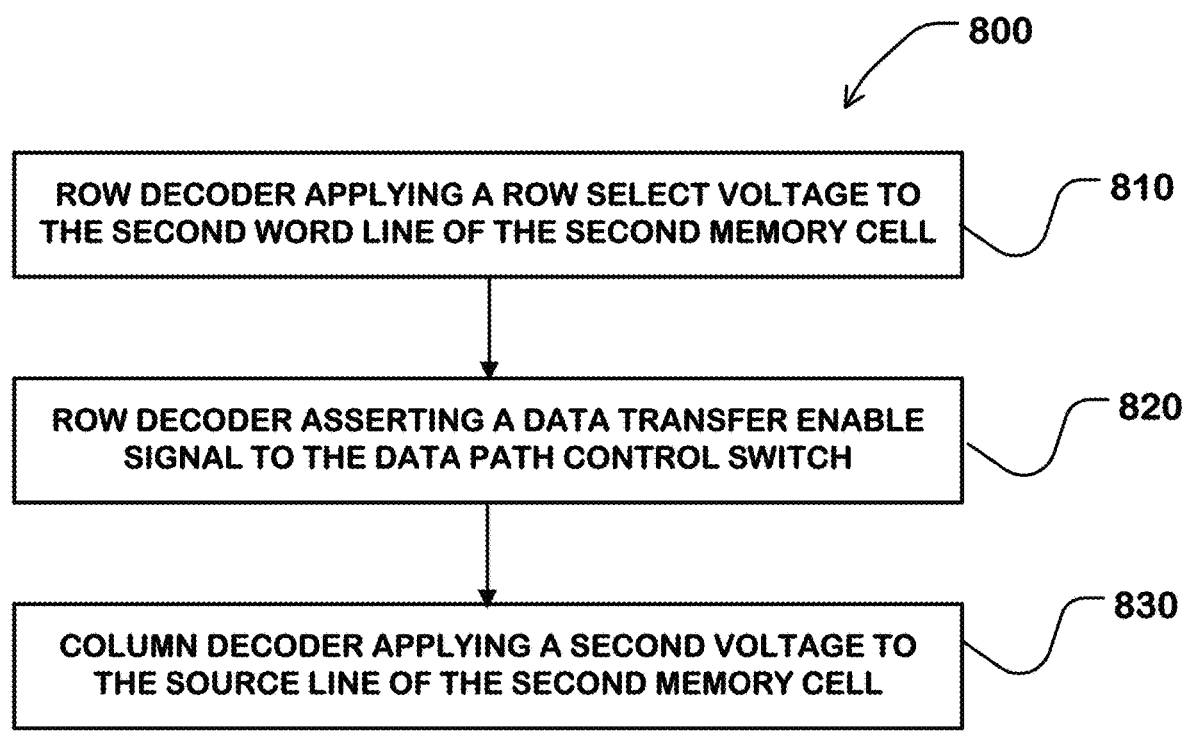
FIG. 8 illustrates an example method of transferring data from the first memory cell to the second memory cell in a composite memory unit.

FIG. 8 illustrates an example method 800 of transferring data from the first memory cell 402 to the second memory cell 404 in the composite memory unit 400. The example method can be used to store a weight in the first memory cell to the second memory cell in a composite memory unit. Even though the example method 800 is described in conjunction with the composite memory unit 400, the example method 900 can be performed by any other embodiment of composite memory units described herein. At step 810, the row decoder and driver circuitry 440 applies a row select voltage to the second word line 428 of the second memory cell 404. At step 820, the row decoder and driver circuitry 440 asserts a data transfer enable signal to the data path control switch 406 to enable data transfer between the first memory cell 402 and the second memory cell 404. At step 830, the column decoder and driver circuitry 442 applies a second activating voltage to the source line 434 of the second memory cell 404. The second activating voltage creates a voltage difference between the resistive RAM of the second memory cell 404 and the pair of cross-coupled inverters 407 of the first memory cell 402, allowing data to be transferred from the pair of cross-coupled inverters 407 to the resistive RAM of the second memory cell 404 through the intra-unit data path 418. The current in the intra-unit data path is determined by the weight factor $W_F$ stored in the current carrying terminal of the first memory cell 402 connected to the first intra-unit data path 418. The current from the intra-unit data path 418 writes a new weight factor $W_S$ in the resistive RAM of the second memory cell 404 on dependence upon the weight factor $W_F$ stored in the first memory cell 402.

Figure 9:
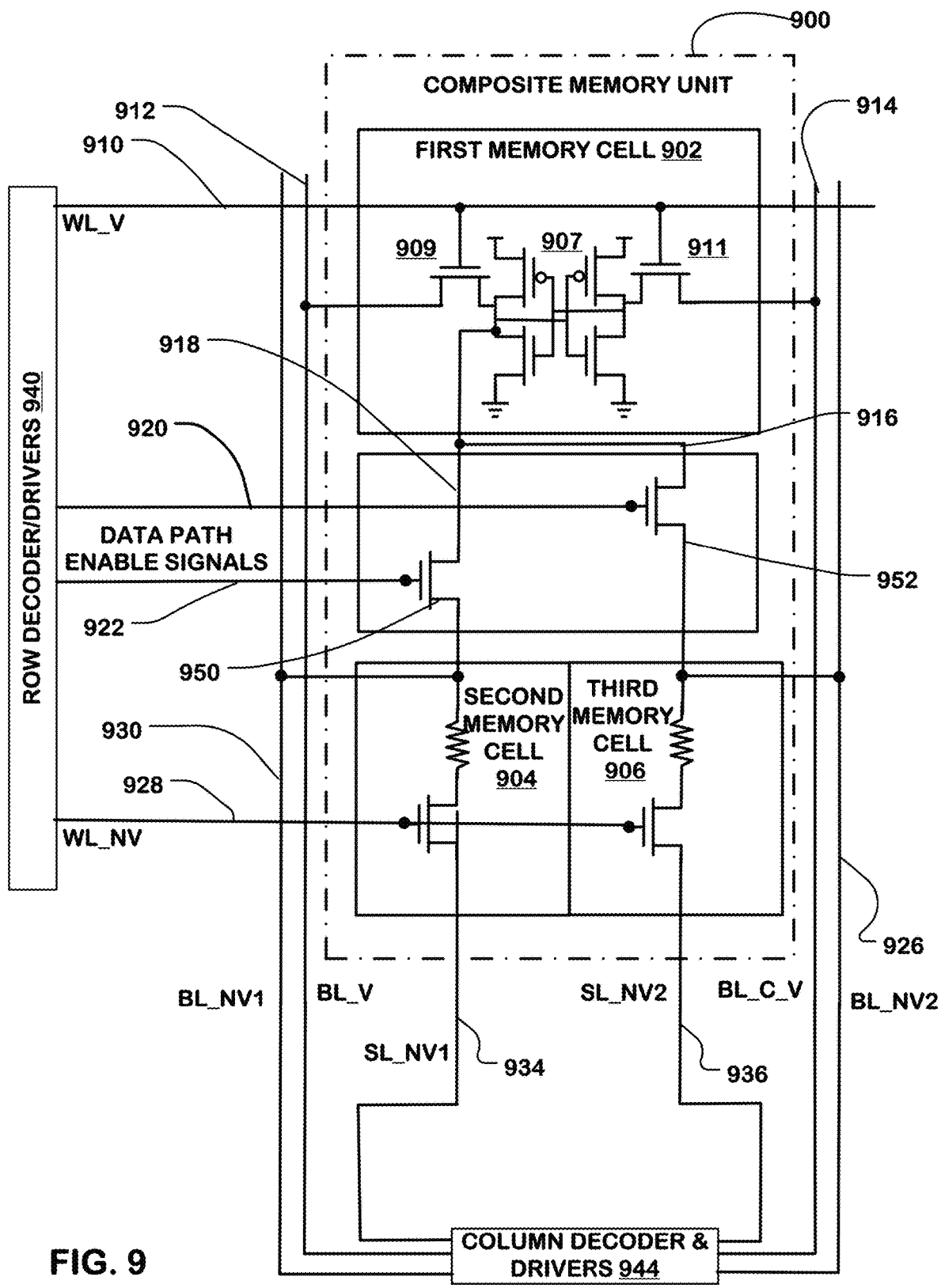
FIG. 9 illustrates a composite memory unit with an SRAM as the first memory cell and 1T-1R RRAMs as the second and third memory cells.

FIG. 9 illustrates a composite memory unit 900 with an SRAM as the first memory cell 902, a first 1T-1R RRAM as the second memory cell 904 and a second 1T-1R as the third memory cell 906. In some embodiments of the composite memory unit 900, the second memory cell 904 can be used to store weights for the first memory cell and the third memory cell 906 can be used to store results from sum-of-products operations performed in the first memory cell 902. The SRAM in first memory cell 902 includes a pair of cross-coupled inverters 907 and two pass-gate transistors 909 and 911. The pass-gate transistors 909 and 911 are coupled to a first word line 910. One of the pass-gate transistors is coupled to a first bit line 912, while the other is coupled to a first bit complement line 914. A weight factor $W_F$ and the complement of the weight factor $\sim W_F$ may be stored in the pair of cross-coupled inverters 907 of the first memory cell 902.

The second memory cell 904 and the third memory cell 906 include a transistor and a resistive RAM. The second memory cell 504 and the third memory cell 906 are electrically coupled to a second word line 928. The second memory cell 904 is coupled to a second bit line 930 and a first source line 934. The third memory cell 906 is coupled to a third bit line 926 and a second source line 936.

A first intra-unit data path 918 connects a current carrying terminal of one of the inverters (i.e., the terminal storing the weight factor $W_F$) in the first memory cell 902 to one of the current carrying terminals of the resistive RAM of the second memory cell 904. An N-channel transistor acting as the first data path control switch 950 controls the current flow or data transfer between the pair of cross-coupled inverters 907 of the first memory cell 902 and the resistive RAM of the second memory cell 904. A second intra-unit data path 916 connects the same current carrying terminal of one of the inverters in the first memory cell 902 to one of the current carrying terminals of the resistive RAM of the third memory cell 906. Another N-channel transistor acting as the second data path control switch 952 controls the current flow or data transfer between the pair of cross-coupled inverters 907 of the first memory cell 902 and the resistive RAM of the third memory cell 906.

A first signal control circuitry, such as the row decoder and driver circuitry 940, is electrically coupled to the first memory cell 902 through the first word line 910, and the second memory cell 904 and the third memory cell 906 through the second word line 928. The row decoder and driver circuitry 940 is also coupled to the gate terminals of the first data path control switch 950 and the second data path control switch 952 through the conducting paths 920 and 922, respectively.

A column decoder and driver circuitry 944 is coupled to the first memory cell 902 through the first bit line 912 and the first bit complement line 914. The column decoder and driver circuitry 944 is electrically coupled to the second memory cell 904 through the second bit line 930 and the first source line 934. The column decoder and driver circuitry 944 is electrically coupled to the third memory cell 906 through the third bit line 926 and the second source line 936.

Figure 10:
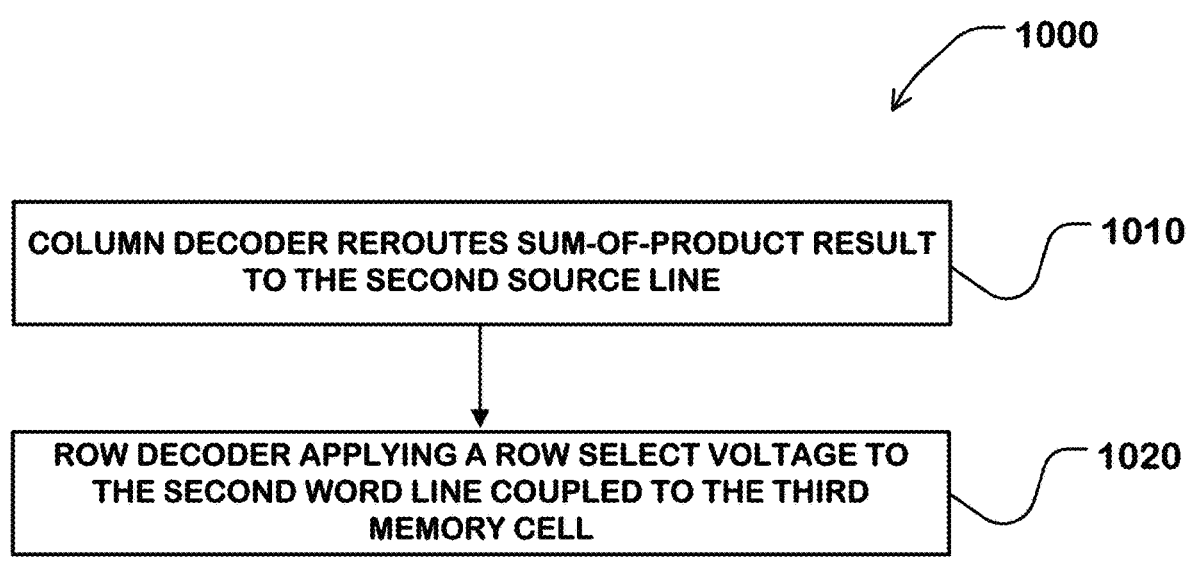
FIG. 10 illustrates an example method of transferring data between the first memory cell and the third memory cell in a composite memory unit.

FIG. 10 illustrates an example method 1000 of storing the result of the sum-of-products operation by the first memory cell 902 to the third memory cell 906 in the composite memory unit 900. At step 1010, the column decoder and driver circuitry 944 reroutes a signal representing the result of a sum-of-products operation by the first memory cell 902 and the first bit line 1012 applies a third activating voltage to the second source line 936 of the third memory cell 906. The third activating voltage creates a voltage difference between the resistive RAM of the third memory cell 906 and the pair of cross-coupled inverters 907 of the first memory cell 902, allowing data to be transferred from the pair of cross-coupled inverters 907 to the resistive RAM of the third memory cell 906 through the second intra-unit data path 916. At step 1020, the row decoder and driver circuitry 940 applies a row select voltage to the second word line 928 of the third memory cell 906. The rerouted signal writes the data in the resistive RAM of the third memory cell 906.

Figure 11:
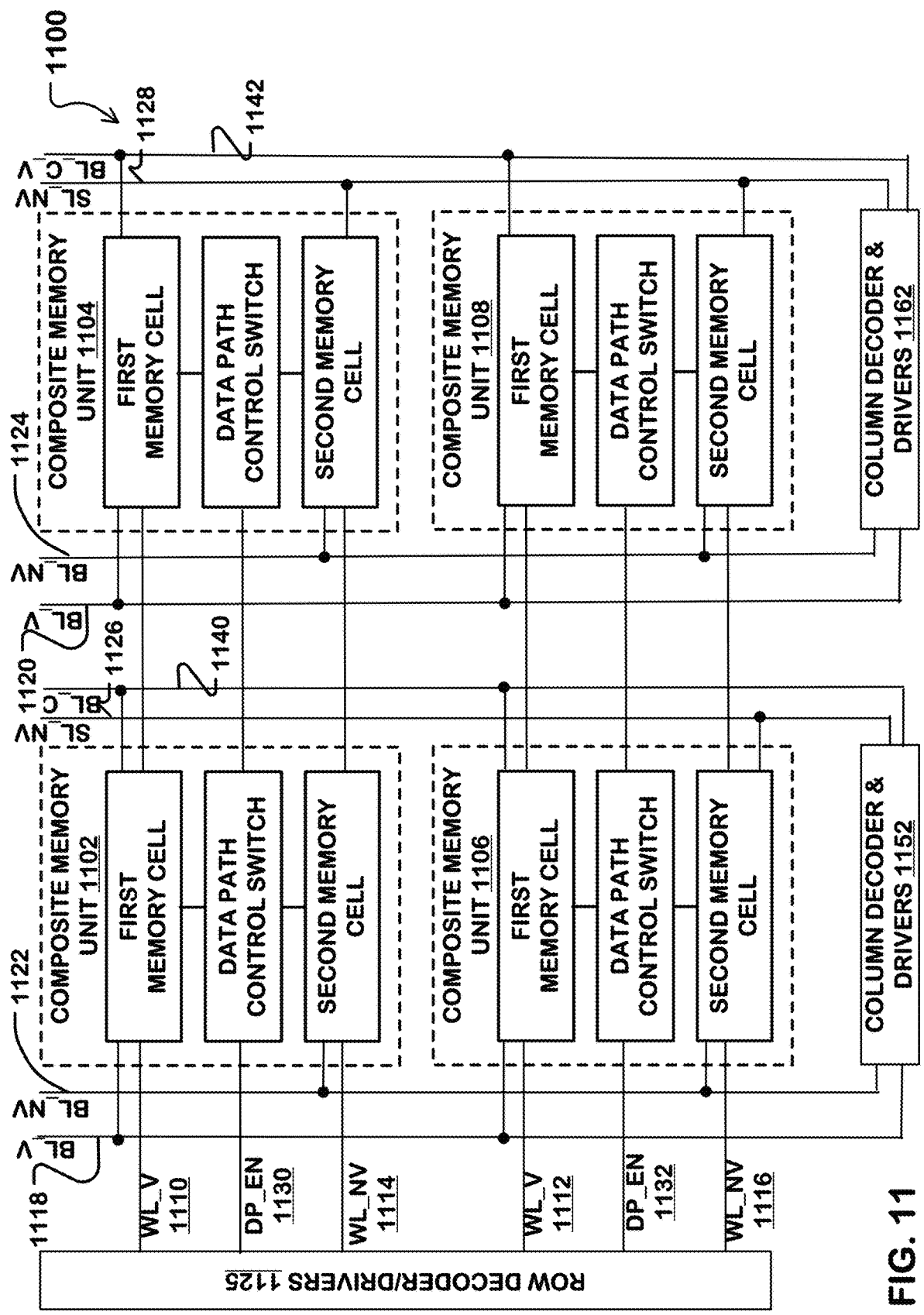
FIG. 11 illustrates an array of composite memory units with SRAMs as the first memory cells and 1T-1R RRAMs as the second memory cells.

FIG. 11 illustrates an array 1100 of composite memory (e.g., the composite memory unit 400) with SRAMs as the first memory cells and 1T-1R RRAMs as the second memory cells. The array 1100 comprises composite memory units (e.g., composite memory units 1102, 1104, 1106 and 1108) arranged in rows and columns. As used herein, the terms "row" and "column" are defined by the lines that the memory cells in the composite memory units share, rather than by physical location. For clarity, only two rows and two columns of composite memory units are shown in FIG. 11. However, an array of composite memory units can have any number of rows or columns implementing the technology described herein.

Rows of composite memory units share common first word lines (e.g., common word lines 1110 and 1112) coupling the first memory cells in the rows to the row decoder and driver circuitry 1125. Rows of composite memory units also share common second word lines (e.g., common word lines 1114 and 1116) coupling the second memory cells in the rows to the row decoder and driver circuitry 1125. The row decoder and driver circuitry 1125 are also configured to assert data transfer enable signals to data path control switches in rows of composite memory units through common conducting paths (e.g., common conducting paths 1130 and 1132). In some embodiments, data transfer between the first memory cells and the second memory cells in a row of composite memory units can be enabled by asserting a common data transfer enable signal to all the data path control switches in the row. Data can be transferred from the first memory cells to the second memory cells in the row or from the second memory cells to the first memory cells.

Columns of composite memory units share common first bit lines (e.g., common first bit lines 1118 and 1120), common second bit lines (e.g., common second bit lines 1122 and 1124) and common first source lines (e.g., common first source lines 1126 and 1128). The common first bit lines, the common first bit complement lines, the common second bit lines, and the common first source lines couple the first memory and second cells to the column decoders and drivers 1152 and 1162. Columns of composite memory units also share common first bit complement lines (e.g., common first complement bit lines 1140 and 1142). First memory cells in the composite memory units 1102 and 1106 are coupled to the column decoders and drivers 1152 through the common first bit complement line 1140, and the first memory cells in the composite memory units 1104 and 1108 are coupled to the column decoders and drivers 1162 through the common first bit complement line 1142.

In some embodiments, signals on the first word lines represent inputs $x_i$ to the first memory cells in respective rows of composite memory units. Output current sensed at a particular first bit line by the column decoders and drivers 1152 and 1162 can represent a sum-of-products of the inputs $x_i$ by respective weight factors $W_F$ in the column of first memory cells coupled to the particular first bit line. In some embodiments, a signal on the common second bit line represents an input x to the second memory cells in a column of composite memory units. Output current sensed at the first source line coupled to the second memory cells by the column decoders and drivers 1152 and 1162 can represent a sum-of-products of the input x by respective weight factors $W_S$ in the column of second memory cells coupled to the common second bit line.

Figure 12:
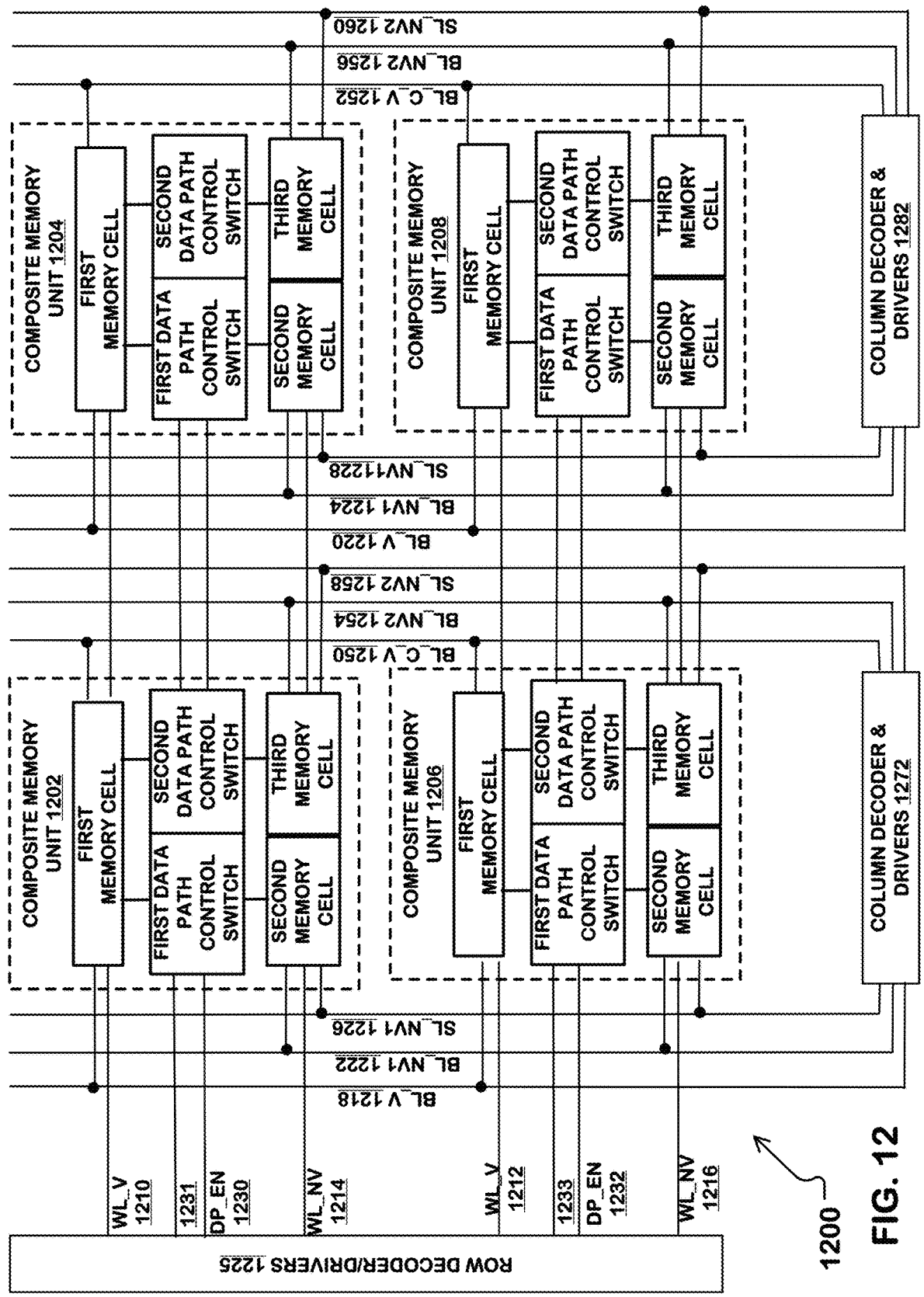
FIG. 12 illustrates an array of composite memory units with SRAMs as the first memory cells and 1T-1R RRAMs as the second and third memory cells.

FIG. 12 illustrates an array of composite memory units (e.g., the composite memory unit 900) with SRAMs as the first memory cells and 1T-1R RRAMs as the second and third memory cells. The array 1200 comprises composite memory units (e.g., composite memory units 1202, 1204, 1206 and 1208) arranged in rows and columns.

Rows of composite memory units share common first word lines (e.g., common first word lines 1210 and 1212) coupling the first memory cells in the rows to the row decoder and driver circuitry 1225. Rows of composite memory units also share common second word lines (e.g., common word lines 1214 and 1216) coupling the second memory cells and third memory cells in the rows to the row decoder and driver circuitry 1225. The row decoder and driver circuitry 1225 are also configured to assert data transfer enable signals to first data path control switches and second data path control switches in rows of composite memory units through common conducting paths (e.g., common conducting paths 1230, 1231, 1232 and 1233).

Columns of composite memory units share common first bit lines (e.g., common first bit lines 1218 and 1220), common first bit complement lines (e.g., common first bit complement lines 1250 and 1252), common second bit lines (e.g., common second bit lines 1222 and 1224), common third bit lines (e.g., common third bit lines 1254 and 1256), common first source lines (e.g., common first source lines 1226 and 1228) and common second source lines (e.g., common first source lines 1258 and 1260). The common first bit lines and the common first bit complement lines couple the first memory cells to the column decoders/drivers 1272, 1282. The common second bit lines and the common first source lines couple the second memory cells to the column decoders/drivers 1272, 1282. The common third bit lines and the common second source lines couple the third memory cells to the column decoders/drivers 1272, 1282.

Figure 13:
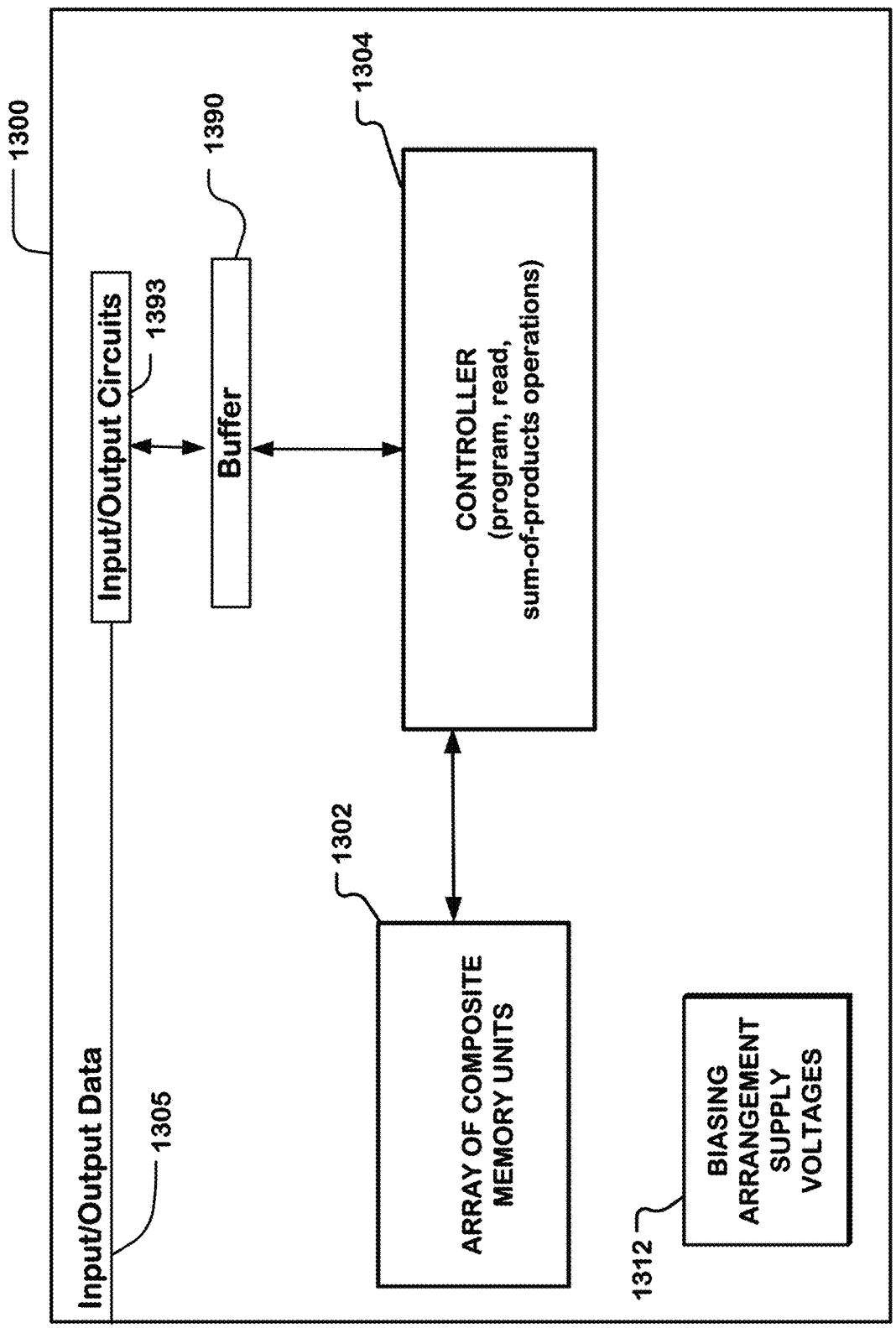
FIG. 13 illustrates a simplified chip block diagram of an example in-memory computing memory device with an array of composite memory units.

FIG. 13 illustrates a simplified chip block diagram of an in-memory computing device 1300 implementing a neural network. The in-memory computing device 1300 includes an array of composite memory units 1302. The array of composite memory units 1302 comprises a plurality of composite memory units described herein arranged in rows and columns. Each composite memory unit comprises a first memory cell, a second memory cell, and a first intra-unit data path connecting the first memory cell to the second memory cell. The first memory cell is a volatile memory cell while the second memory cell is a non-volatile memory cell. In some embodiments, each composite memory unit in the array may further comprise a third memory cell, the third memory cell connected to the first memory cell by a second intra-unit data path. The first memory cells and the second memory cells in the array can store weights for the synaptic layers of the neural network. Circuit operations in the first and second memory cells in the array perform the inferencing of input data in the neural network and produce output data. The array of composite memory units 1302 further comprises row decoder and driver circuitry, and column decoder and driver circuitry as shown in FIGS. 11 and 12.

Input/output circuits 1393 receive input data from sources external to the in-memory computing device 1300. The input/output circuits 1393 also drive output data to destinations external to the in-memory computing device 1300. Input/output data and control signals are moved via data bus 1305 between the input/output circuits 1393, the controller 1304 and input/output ports on the in-memory computing device 1300 or other data sources internal or external to the in-memory computing device 1300, such as a general purpose processor or special purpose application circuitry, or a combination of modules providing system-on-a-chip functionality supported by the array of composite memory units 1302. Buffer circuits 1390 can be coupled to the input/output circuits 1393 and the controller 1304 to store input/output data and control signals.

The controller 1304 can include circuits for selectively applying program voltages, such as row select voltages, activating voltages and data transfer enable signals, to the first and second memory cells in the array of composite memory units 1302 in response to the input data and control signals in the buffer circuits 1390. In the example shown in FIG. 13, the controller 1304, using a bias arrangement state machine 1312, controls the application of supply voltages generated or provided through the voltage supply or supplies in the array of composite memory units 1302, for sum-of-products operations, and data transfer between the memory cells in the composite memory units. The controller 1304 is coupled to the buffer circuits 1390 and the array of composite memory units 1302. The controller 1304 can include control circuits arranged to execute the procedures described with respect to FIGS. 5-8.

The controller 1304 can be implemented using special-purpose logic circuitry as known in the art. In alternative embodiments, the controller 1304 comprises a general-purpose processor, which can be implemented on the same integrated circuit, which executes a computer program to control the operations of the device. In yet other embodiments, a combination of special-purpose logic circuitry and a general-purpose processor can be utilized for implementation of the controller 1304. A bias arrangement state machine 1312 controls the biasing arrangement supply voltages as described herein.

A number of flowcharts illustrating logic executed by a memory controller or in-memory computing devices are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the disclosure, and it will be understood that numerous additional steps for accomplishing other functions can be performed before, after and between those shown.

While the present disclosure is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the disclosure and the scope of the following claims.

What is claimed is:

1. A memory device, comprising:
   a plurality of composite memory units arranged in rows and columns, at least one of the plurality of composite memory units comprising a first memory cell, a second memory cell, and a first intra-unit data path connecting the first memory cell to the second memory cell, wherein the first memory cell is of a first type and the second memory cell is of a second type,
   wherein at least one of the plurality of composite memory units further comprises a first data path control switch, wherein the first data path control switch is responsive to a data transfer enable signal to enable data transfer between the first memory cell and the second memory cell through the first intra-unit data path;
   a signal control circuitry, the signal control circuitry asserting data transfer enable signals to first data path control switches in the plurality of composite memory units;
   a set of source lines, source bit lines in the set of source lines connecting second memory cells in respective columns of composite memory units to the signal control circuitry; and
   control circuits arranged to perform sum-of-products operations and storing results in a selected composite memory unit comprising a first memory cell storing a weight, a second memory cell, a first intra-unit data path, a first data path control switch, the control circuits configured to perform, in coordination, to accomplish the sum-of-products operations and storing results, the steps of:
   precharging a first bit line coupled to the first memory cell with a signal representing an input;
   applying a row select voltage to a first word line coupled to the first memory cell; and
   applying the row select voltage to a second word line coupled to the second memory cell;
   asserting a data transfer enable signal to the first data path control switch; and
   applying an activating voltage to a first source line coupled to the second memory cell to store a product of the input and the weight in the second memory cell.

2. A method of performing sum-of-products operations and storing results in a composite memory unit, the composite memory unit comprising a first memory cell of a first type storing a weight, a second memory cell of a second type, a first intra-unit data path connecting the first memory cell to the second memory cell, and a first data path control switch responsive to a data transfer enable signal to enable data transfer between the first memory cell and the second memory cell through the first intra-unit data path, wherein the first memory cell coupled to a first word line and a first bit line, and the second memory cell coupled to a second word line, a second bit line and a first source line, the method comprising:
   precharging the first bit line of the first memory cell with a signal representing an input;
   applying a row select voltage to the first word line of the first memory cell;
   applying the row select voltage to the second word line of the second memory cell;
   asserting the data transfer enable signal to the first data path control switch; and applying an activating voltage to the first source line of the second memory cell to store a product of the input and the weight in the second memory cell.

3. The method of claim 2, further comprising sensing current at the first bit line of the first memory cell, the current representing the product of the input and the weight.

* * * * *